(12) United States Patent
Wen et al.

(10) Patent No.: US 7,866,616 B2
(45) Date of Patent: Jan. 11, 2011

(54) FIXING DEVICE

(75) Inventors: Szu-Cheng Wen, Hsinchu County (TW); Hung-Feng Tai, Hsinchu County (TW)

(73) Assignee: Accton Technology Corporation, Hsinchu (TW)

( * ) Notice: Subject to any disclaimer, the term of this patent is extended or adjusted under 35 U.S.C. 154(b) by 752 days.

(21) Appl. No.: 11/533,687

(22) Filed: Sep. 20, 2006

(65) Prior Publication Data
US 2008/0011919 A1  Jan. 17, 2008

(30) Foreign Application Priority Data
Jul. 13, 2006  (TW) ............................... 95125616 A

(51) Int. Cl.
*A47B 96/06* (2006.01)
(52) U.S. Cl. ............................... 248/219.4; 248/219.1
(58) Field of Classification Search ............. 248/218.4, 248/219.1, 219.2, 219.3, 219.4, 185.1, 291.1, 248/286.1, 230.1, 230.4, 231.51
See application file for complete search history.

(56) References Cited
U.S. PATENT DOCUMENTS

| | | | | |
|---|---|---|---|---|
| 2,846,570 A | * | 8/1958 | Harling | 362/396 |
| 2,883,135 A | * | 4/1959 | Smalley | 248/230.5 |
| 2,883,136 A | * | 4/1959 | Smalley | 248/230.5 |
| 3,704,001 A | * | 11/1972 | Sloop | 248/219.4 |
| 3,750,992 A | * | 8/1973 | Johnson | 211/107 |
| 4,121,796 A | * | 10/1978 | Forbes | 248/62 |
| 4,179,774 A | * | 12/1979 | Bradbury | 24/132 R |
| 4,489,910 A | * | 12/1984 | Ferguson | 248/219.4 |
| 6,232,928 B1 | * | 5/2001 | Zimmerman et al. | 343/882 |
| 2005/0284995 A1 | * | 12/2005 | Hutter, III | 248/235 |

* cited by examiner

*Primary Examiner*—Kimberly T Wood
(74) *Attorney, Agent, or Firm*—WPAT, PC; Justin King

(57) ABSTRACT

A fixing device is suitable for fixing an object onto a post, and includes a base and a pair of clip plates. The base connects the object. Each of the clip plates has a pivoting side and a fastening side opposite to the pivoting side, wherein the pivoting sides are pivoted on the base, and the fastening sides are connected to each other in a detachable mode. The pair of clip plates and the base together form an enclosure space for holding a segment of the post. Therefore, the fixing device is easily to fix the object onto the post.

10 Claims, 4 Drawing Sheets

US 7,866,616 B2

FIXING DEVICE

CROSS-REFERENCE TO RELATED APPLICATION

This application claims the priority benefit of Taiwan application Ser. No. 95125616, filed on Jun. 13, 2006. All disclosure of the Taiwan application is incorporated herein by reference.

BACKGROUND OF THE INVENTION

1. Field of Invention

The present invention relates to a fixing device, and more particularly, to a fixing device for fixing an object on a post.

2. Description of the Related Art

Along with the progress in science and technology, PCs have been popularized deeply in our daily lives and held a decisive position in the work of the people today, even in our leisure and entertainment. In addition to a PC self, the people today also widely use Internet to link outside for information transfer and exchange. Thus, Internet access has become one of essential function to be realized in a computer.

The major means to access Internet is Ethernet. In order to join Ethernet, the computer must be linked to LAN (local area network) via a network wire. However, such a wire connection mode, same as the traditional telephone in its early age, requires the computer to be placed indoor for Internet access. To get rid of wire or cable bondages, a wireless network emerged a couple of years ago. With a wireless network, the wire or cable is discarded; instead, in the wireless network frame, the network behaves very flexible indeed by means of the penetrating power of radio wave. The launch of the wireless network turns over a conservative conception that the network must be bounded with wires, which provides users with great usage choices, so that a user can access Internet going around indoor with a notebook computer even allows to do the same job with a notebook computer wandering outdoor as well.

A wireless network basically needs two parts, a client and a access point (AP). A computer counted as a client must be equipped with a wireless network card or a built-in wireless network module, while a corresponding AP must be established at a node of a LAN. At the upper side of an AP, there is an antenna, by which the wireless signals can be transmitted to a computer and a wireless communication between the AP and the computer is conducted to achieve the wireless Internet access purpose.

Since the power for an AP to transmit wireless signals is limited, thus, the position to setup an AP is a critical issue to deal with. For the indoor setup, there is no location worry for sure; but for outdoor setup, for example at a campus, a park or a square, it could be a problem to fix an AP.

SUMMARY OF THE INVENTION

One of the objectives of the present invention is to provide a fixing device to easily fix an object on a post.

To achieve the above-mentioned or other objectives, the present invention provides a fixing device, which includes a base and a pair of clip plates. The fixing device is suitable for fixing an object onto a post. The base connects the object. The pair of clip plates respectively has a pivoting side and a fastening side opposite to the pivoting side, wherein the pivoting sides are pivoted on the base, while the pair of fastening side are connected to each other in a detachable mode. The pair of clip plates and the base together form an enclosure space to embrace a segment of the post.

In an embodiment of the present invention, the base may connect the object in a detachable mode.

In an embodiment of the present invention, the base may connect the object by screws.

In an embodiment of the present invention, the base may include a first member and a second member, wherein the first member is pivoted on the second member, the first member connects the object, the pair of clip plates are pivoted on the second member, and the pair of clip plates and the base together form an enclosure space.

In an embodiment of the present invention, the base may further include an adjustment mechanism, which is disposed between the first member and the second member and includes a first bracket and a second bracket. The first bracket connects one of the first member and the second member and has at least an arc slide track. The second bracket connects the other of the first member and the second member and has at least a positioning slide block. The positioning slide block is held in the arc slide track and a varied relative position between the positioning slide block and the arc slide track is corresponding to an adjusted relative position between the first bracket and the second bracket.

In an embodiment of the present invention, the base may further include an adjustment mechanism, which is disposed between the first member and the second member and includes a pair of first brackets and a pair of second brackets. The pair of first brackets connects one of the first member and the second member and has a pair of arc slide tracks. The pair of second brackets connect the other of the first member and the second member and has a pair of positioning slide blocks. The positioning slide blocks are respectively held in the arc slide tracks and a varied relative position between the positioning slide blocks and the arc slide tracks are corresponding to an adjusted relative position between the pair of first brackets and the pair of second brackets.

In an embodiment of the present invention, the angle adjustments of the pair of clip plates relative to the base may be corresponding to the dimension adjustment of the enclosure space.

In an embodiment of the present invention, the base may have a pair of pivot hinge gaps. The pivoting sides are respectively inserted in the pivot hinge gaps to restrict the swing angles of the pair of clip plates relative to the base.

In an embodiment of the present invention, the base may have multiple pairs of pivot hinge gaps and the pivoting sides are respectively inserted into one of the pairs of pivot hinge gaps to restrict the swing angles of the pair of clip plates relative to the base, wherein the position of each the pair of pivot hinge gaps is corresponding to the dimension of the enclosure space.

In an embodiment of the present invention, the fixing device may further include at least a fastener to tighten the fastening sides together. The fastener may include a bolt and a nut for tightening the fastening sides together.

In an embodiment of the present invention, one of the clip plates may have a buffer pad, which is disposed on the surface of the corresponding clip plate where the post is contacted.

In an embodiment of the present invention, the base may have at least a stopper flange, which is protruded from the base and extended into the enclosure space for holding the surface of the post.

According to the present invention, the pivoting sides of a pair of clip plates are pivoted on the base, the pair of clip plates and the base together form an enclosure space for embracing a segment of a post and the fasteners are used to tightening the fastening side of the pair of clip plates together, so as to fix the fixing device on the post. Therefore, the present invention provides an easier way to fix the fixing device on the post after fixing the object in the fixing device.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

Figure 1:
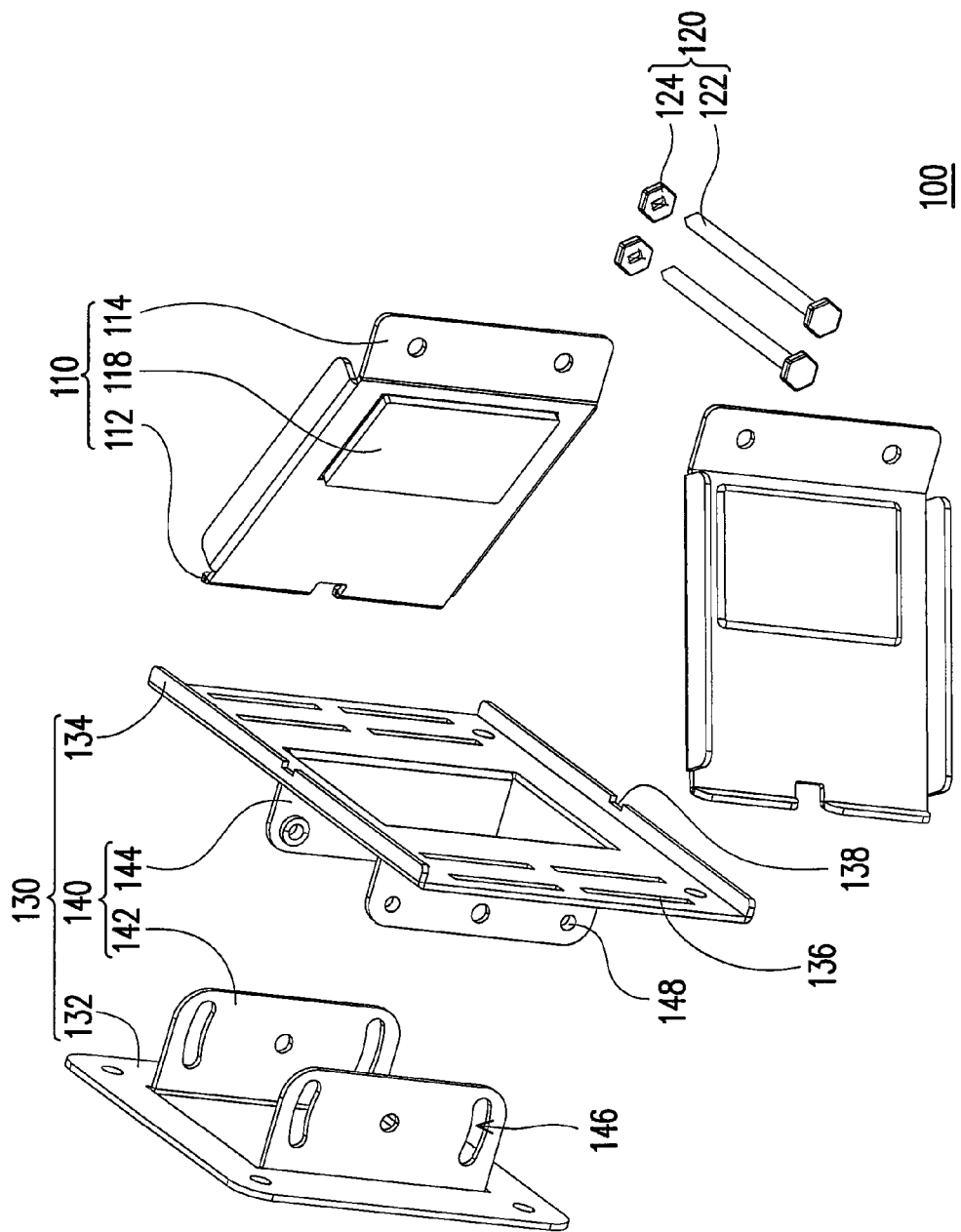
FIG. 1 is a perspective view of a fixing device according to an embodiment of the present invention in an exploded state.

FIG. 1 is an perspective view of a fixing device according to an embodiment of the present invention in an exploded state. Referring to FIG. 1, the fixing device 100 includes a pair of clip plates 110, at least a fastener 120 and a base 130. Each of the clip plates 110 has a pivoting side 112 and a fastening side 114 opposite to 112 and has a buffer pad 118. The fastener 120 includes a bolt 122 and a nut 124. The base 130 includes a first member 132, a second member 134, an adjustment mechanism 140, pairs of pivot hinge gaps 136 and at least a stopper flange 138. The adjustment mechanism 140 further includes a pair of first brackets 142 and a pair of second brackets 144, wherein the pair of first brackets 142 has a pair of arc slide tracks 146, while the pair of second brackets 144 has a pair of positioning slide blocks 148.

Figure 2:
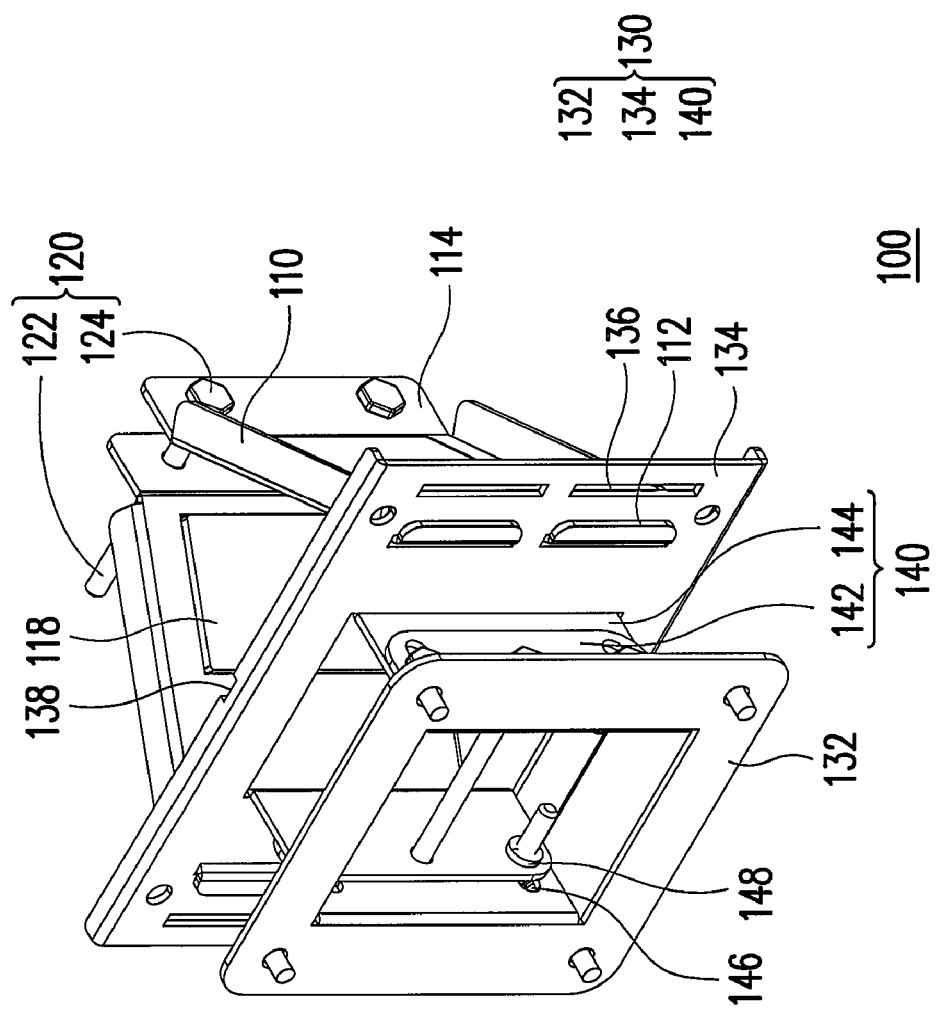
FIG. 2 is a perspective view of the fixing device in FIG. 1 in an assembled state.

FIG. 2 is a perspective view of the fixing device in FIG. 1 in an assembled state. Referring to FIG. 2, the pivoting sides 112 of the pair of clip plates 110 in the embodiment are pivoted on the base 130 by inserting the pivoting sides 112 respectively into the pivot hinge gaps 136 of the second member 134, wherein the pairs of pivot hinge gaps 136 can be available, but only one of the pairs needs to be chosen for assembly. The fastening sides 114 are tightened together in a detachable mode, and the fastening sides 114 and the base 130 together form an enclosure space. The pivot hinge gaps 136 are able to restrict the swing angles of the pair of clip plates 110 relative to the base 130 so that the position between the pair of clip plates 110 and the pivot hinge gaps 136 is corresponding to the dimension of the enclosure space. In addition, the stopper flange 138 on the base 130 is protruded from the base 130 and extended into the enclosure space for holding the surface of the object to be fixed. Each of the clip plates 110 has a buffer pad 118 thereon for buffering the contact between the surface of the corresponding clip plate 110 and the surface of the post 370 (shown in FIG. 3A). The bolt 122 and the nut 124 of the fastener 120 tighten the fastening sides 114 together, so as to mount the fixing device 100 on the post 370.

Referring to FIG. 2 again, the adjustment mechanism 140 of the embodiment includes a pair of first brackets 142 and a pair of second brackets 144. The first brackets 142 connect one of the first member 132 and the second member 134 and have a pair of arc slide tracks 146. The second brackets 144 connect the other of the first member 132 and the second member 134 and have a pair of positioning slide blocks 148.

The positioning slide blocks 148 are respectively held in the corresponding arc slide tracks 146 and a varied relative position between the positioning slide blocks 148 and the arc slide tracks 146 is used to adjust the relative position between the first brackets 142 and the second brackets 144, that is to say changing the relative position between the first brackets 142 and the second brackets 144 is able to make the first brackets 142 swing relative to the second brackets 144.

Figure 3A:
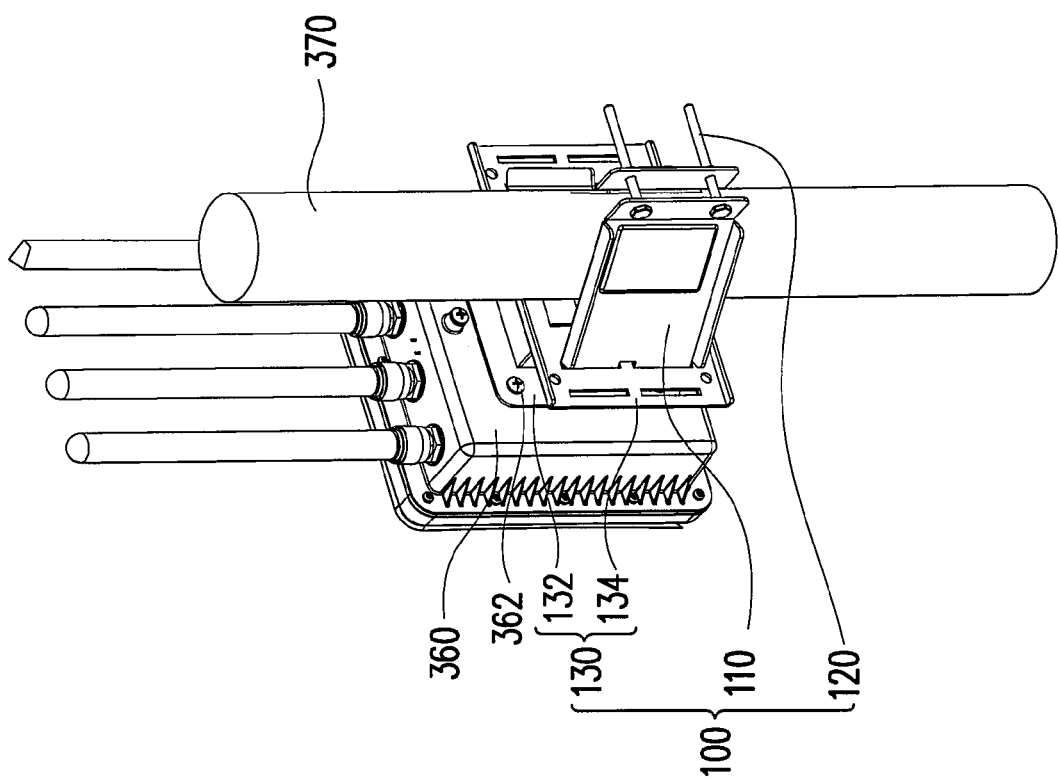
FIG. 3A and FIG. 3B are perspective views from different viewpoints showing the fixing device of FIG. 1 mounted on a post with the fixed object.
Figure 3B:
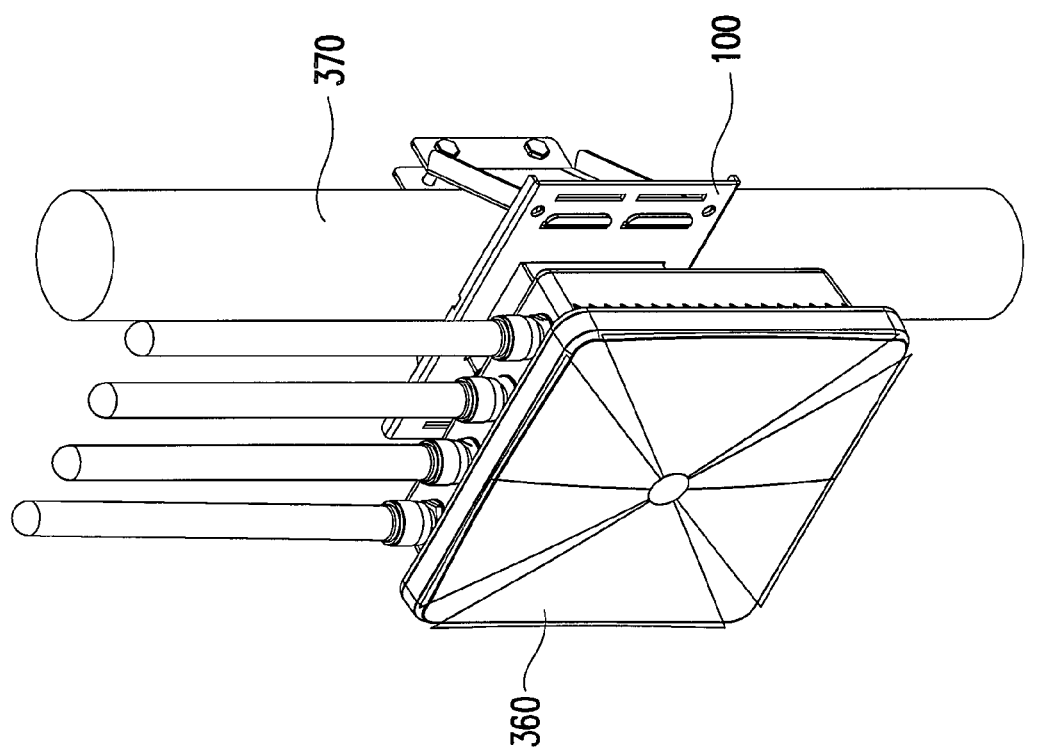

FIG. 3A and FIG. 3B are perspective views from different viewpoints showing the fixing device of FIG. 1 mounted on a post with the fixed object. Referring to FIGS. 3A and 3B, the fixing device 100 of the embodiment serves for fixing an object 360 onto a post 370. The first member 132 of the base 130 connects the object 360 by the screws 362 such that the base 130 connects the object 360 in a detachable mode. In the meantime, the first member 132 is pivoted on the second member 134. The pair of clip plates 110, pivoted on the second member 134, and the base 130 together form an enclosure space for embracing a segment of the post 370, followed by tightening the pair of clip plates 110. Therefore, it is an easier way to fix the object 360 on the post 370 by using the fixing device 100 after fixing the object 360 in the fixing device 100.

In addition, in the above embodiment, the fixing device is used for fixing an object on a post. The object may be an access point or a camera and so on.

In summary, the fixing device of the present invention has at least the following advantages:

1. The fixing device of the present invention employs a pair of clip plates and makes the pivoting sides of the pair of clip plates respectively inserted into two pivot hinge gaps of the base to swing the clip plates relative the base, wherein the pair of clip plates and the base together form an enclosure space to hold a post; by using a fastener to tighten the pair of clip plates, the pair of clip plates and the base are fixed on the post; meanwhile by screws, the object is fixed on the base. Therefore, the present invention is able to easily fix the object on an outdoor post by using the fixing device.

2. The base of the fixing device of the present invention may further have multiple pairs of pivot hinge gaps, so that the pair of clip plates and the base are able to be fixed on different posts with different outer diameters by adjusting the pivoting positions of the clip plates on the base according to the real diameter of the post.

3. The fixing device of the present invention may further have at least a positioning slide block and at least a arc slide track. By changing the relative positions between the positioning slide block and the arc slide track, the first bracket is able to swing relative to the second bracket, so as to adjust the relative orientation angle between the object and the post.

It will be apparent to those skilled in the art that various modifications and variations can be made to the structure of the present invention without departing from the scope or spirit of the invention. In view of the foregoing, it is intended that the specification and examples to be considered as exemplary only, with a true scope and spirit of the invention being indicated by the following claims and their equivalents.

What is claimed is:

1. A fixing device, suitable for fixing an object onto a post, comprising:

a base, suitable for connecting the object, having multiple pair of pivot hinge slots, a first member which connects to the object, and a second member which is pivoted on the first member; and a pair of planar clip plates, each of the planar clip plates having a pivoting side and a fastening side opposite to the pivoting side, wherein each of the pivoting sides of each planar clip plate includes at least one flange which is inserted into the corresponding at least one pivot hinge slot of the base such that both the pivoting sides are pivoted on the second member of the base, the fastening sides are connected to each other in a detachable mode, and the pair of planar clip plates and the base together form an enclosure space for holding a segment of the post, wherein the pivoting sides are respectively inserted in one of the pairs of pivot hinge slots for restricting the swing angles of the pair of planar clip plates relative to the base, and the positions of the pairs of pivot hinge slots are corresponding to the dimensions of the enclosure space.

2. The fixing device of claim 1, wherein the base connects the object in a detachable mode.

3. The fixing device of claim 1, wherein the base connects the object by screws.

4. The fixing device of claim 1, wherein the base further comprises an adjustment mechanism disposed between the first member and the second member, wherein the adjust mechanism comprises:
   a first bracket, connected to one of the first member and the second member and having at least an arc slide track;
   a second bracket, connected to the other of the first member and the second member and having at least a positioning slide block held in the arc slide track, wherein a relative position variation between the positioning slide block and the arc slide track is corresponding to a relative position between the first bracket and the second bracket.

5. The fixing device of claim 1, wherein the base further comprises an adjustment mechanism disposed between the first member and the second member, wherein the adjust mechanism comprises:
   a pair of first brackets, connected to one of the first member and the second member and having a pair of arc slide tracks;
   a pair of second brackets, connected to the other of the first member and the second member and having a pair of positioning slide blocks which are respectively held in the pair of arc slide tracks, wherein a relative position variation between the positioning slide blocks and the pair of arc slide tracks is corresponding to a relative position between the pair of first brackets and the pair of second brackets.

6. The fixing device of claim 1, wherein an angle adjustment of the pair of planar clip plates relative to the base is corresponding to a dimension adjustment of the enclosure space.

7. The fixing device of claim 1, further comprising:
   at least a fastener to tighten the fastening sides together.

8. The fixing device of claim 7, wherein the fastener comprises a bolt and a nut to tighten the fastening sides together.

9. The fixing device of claim 1, wherein one of the planar clip plates has a buffer pad and the buffer pad is disposed on the surface of the corresponding planar clip plates where the post is contacted.

10. The fixing device of claim 1, wherein the base has at least a stopper flange, which is protruded from the base and extended into the enclosure space for holding the surface of the post.

* * * * *